(12) United States Patent
Romo et al.

(10) Patent No.: US 8,915,140 B2
(45) Date of Patent: Dec. 23, 2014

(54) CORROSION RESISTANT ISOLATOR ASSEMBLY FOR PROCESS DEVICES

(75) Inventors: Mark G. Romo, Eden Prairie, MN (US); Vonne D. Linse, Columbus, OH (US); Andrew J. Klosinski, Waconia, MN (US)

(73) Assignee: Rosemount Inc., Chanhassen, MN (US)

( * ) Notice: Subject to any disclaimer, the term of this patent is extended or adjusted under 35 U.S.C. 154(b) by 179 days.

(21) Appl. No.: 13/440,163

(22) Filed: Apr. 5, 2012

(65) Prior Publication Data

US 2013/0068029 A1 Mar. 21, 2013

Related U.S. Application Data

(60) Provisional application No. 61/473,333, filed on Apr. 8, 2011.

(51) Int. Cl.
| | |
|---|---|
| *G01L 7/08* | (2006.01) |
| *B23K 20/08* | (2006.01) |
| *G01L 13/02* | (2006.01) |
| *G01L 19/00* | (2006.01) |
| *G01L 19/06* | (2006.01) |

(52) U.S. Cl.
CPC .............. *G01L 7/082* (2013.01); *G01L 13/026* (2013.01); *G01L 19/0046* (2013.01); *G01L 19/0645* (2013.01); *B23K 20/08* (2013.01)
USPC ............................................ 73/706; 228/107

(58) Field of Classification Search
None
See application file for complete search history.

(56) References Cited

U.S. PATENT DOCUMENTS

| | | | | |
|---|---|---|---|---|
| 4,136,603 | A | | 1/1979 | Doyle, Jr. |
| 4,852,466 | A | * | 8/1989 | Freeman et al. ................. 92/104 |
| 5,165,281 | A | * | 11/1992 | Bell ................................ 73/718 |
| 5,184,514 | A | | 2/1993 | Cucci et al. ..................... 73/706 |
| 5,230,248 | A | | 7/1993 | Cucci et al. ..................... 73/706 |
| 5,578,760 | A | | 11/1996 | Suzuki |

(Continued)

FOREIGN PATENT DOCUMENTS

| | | |
|---|---|---|
| CN | 1127355 | 7/1996 |
| CN | 1198813 | 11/1998 |

(Continued)

OTHER PUBLICATIONS

Communication dated Nov. 26, 2013 in related European Patent application No. 12718486.9, 2 pgs.

(Continued)

*Primary Examiner* — Lisa Caputo
*Assistant Examiner* — Gregory A Royal
(74) *Attorney, Agent, or Firm* — Westman, Champlin & Koehler, P.A.

(57) ABSTRACT

A process device has a process seal for coupling to an industrial process. The process device includes a process device body having an isolation cavity and an isolation passageway extending from the isolation cavity to a pressure sensor. The isolation cavity and isolation passageway filled with an isolation fluid. An isolation diaphragm is positioned to isolate the isolation cavity from process fluid. The isolation diaphragm has a process fluid side and an isolation fluid side. A weld ring is positioned around a periphery of the process fluid side of the isolation diaphragm. The weld ring is formed of a first material compatible with the isolation diaphragm and a second material compatible with the process device body. A weld secures the weld ring to the process device body.

16 Claims, 9 Drawing Sheets

(56) References Cited

U.S. PATENT DOCUMENTS

| | | | | |
|---|---|---|---|---|
| 5,922,965 | A | 7/1999 | Behm et al. | 73/706 |
| 5,955,675 | A | 9/1999 | Peterson | |
| 6,038,961 | A | 3/2000 | Filippi et al. | 92/98 R |
| 6,050,145 | A | 4/2000 | Olson et al. | 73/706 |
| 6,055,863 | A | 5/2000 | Behm et al. | |
| 6,120,033 | A | 9/2000 | Filippi et al. | 277/315 |
| 6,662,662 | B1 | 12/2003 | Nord et al. | 73/715 |
| 6,675,655 | B2 | 1/2004 | Broden et al. | 73/716 |
| 7,117,745 | B2 | 10/2006 | Broden | 73/706 |
| 7,299,415 | B2 | 11/2007 | Opheim et al. | 715/705 |
| 7,578,194 | B1 | 8/2009 | Hadjiloucas et al. | |
| 7,624,642 | B2 * | 12/2009 | Romo | 73/717 |
| 7,798,007 | B2 | 9/2010 | Dannhauer et al. | |
| 7,814,798 | B2 | 10/2010 | Filippi et al. | |
| 2008/0091376 | A1 | 4/2008 | Russell et al. | 702/107 |

FOREIGN PATENT DOCUMENTS

| | | |
|---|---|---|
| CN | 101198852 | 6/2008 |
| CN | 101509817 | 8/2009 |
| CN | 102159928 | 8/2011 |
| JP | 54-109888 | 8/1979 |
| JP | 55-154453 | 11/1980 |
| JP | 2002-513148 | 5/2002 |
| WO | WO 96/05493 | 2/1996 |

OTHER PUBLICATIONS

International Search Report and Written Opinion from the corresponding International application No. PCT/US2012/032350 dated Jun. 28, 2012.

Office Action from EP Application No. 12718486.9, dated Jul. 28, 2014.

Office Action from Japanese Application No. 2014-503990, dated Aug. 19, 2014.

Chinese Office Action from CN 201280015788.2, dated Aug. 11, 2014.

* cited by examiner

CORROSION RESISTANT ISOLATOR ASSEMBLY FOR PROCESS DEVICES

CROSS-REFERENCE TO RELATED APPLICATION

The present application is based on and claims the benefit of U.S. provisional patent application Ser. No. 61/473,333, filed Apr. 8, 2011, the content of which is hereby incorporated by reference.

BACKGROUND

The present invention relates to process fluid pressure measurement devices. In particular, the present invention relates to a process seal for a process fluid pressure measurement system.

Process devices, such as process fluid pressure transmitters, generally sense pressure using a pressure sensor coupled to at least one isolation diaphragm. The isolation diaphragm isolates the pressure sensor from process fluids that are being sensed. Process fluids, which can be highly corrosive, are thus kept isolated from the pressure sensor to avoid corrosion or damage to the pressure sensor. Pressure is transferred from the isolation diaphragm to the pressure sensor, which has a sensing diaphragm that deflects in response to the applied pressure. The pressure is transferred from the isolation diaphragm to the sensing diaphragm using a substantially incompressible isolation fluid in a passageway that fluidically couples the isolation diaphragm to the sensing diaphragm. U.S. Pat. No. 4,833,922 entitled MODULAR PRESSURE TRANSMITTER and U.S. Pat. No. 5,094,109 entitled PRESSURE TRANSMITTER WITH STRESS ISOLATION DEPRESSION show pressure transmitters of this type.

Various corrosion resistant, high cost metals are sometimes used for the isolation diaphragms. Tantalum, for example, is a material that is very resistant to corrosion, but has a considerably higher melting point than other materials that are conventionally used for isolation diaphragms, such as 316L stainless steel, Hastalloy C and Monel. The isolator housing mounting the isolation diaphragm is generally constructed of a stainless steel alloy which will generally have much lower melting point than a material such as tantalum.

The utilization of materials such as tantalum for applications that require extremely high corrosion resistance creates difficulties with respect to the manufacture of such products. Specifically, since tantalum has a melting point that is substantially higher than the other metals used in the process device, traditional manufacturing methods such as welding are sometimes impractical for joining tantalum to a much lower melting-point metal such as stainless steel. Further, the mixed-metal weld is not able to meet some requirements of NACE (National Association of Corrosion Engineers) for the application. Thus, there are metallurgical incompatibilities between the corrosion resistant material and the rest of the metal used for the process device. As used herein, metallurgically incompatible means that the two materials cannot be welded together practically, or will create an unacceptable mixed-metal weld. Further, the cost of the tantalum or other suitable high-corrosion resistant metal generally drives design criteria that utilize as little of the material as possible. Further still, the manufacturing difficulties encountered in incorporating the tantalum isolation diaphragm into the process device are generally manifested in the form of higher overall product costs and longer product lead time.

SUMMARY

A process device has a process seal for coupling to an industrial process. The process device includes a process device body having an isolation cavity and an isolation passageway extending from the isolation cavity to a pressure sensor. The isolation cavity and isolation passageway filled with an isolation fluid. An isolation diaphragm is positioned to isolate the isolation cavity from process fluid. The isolation diaphragm has a process fluid side and an isolation fluid side. A weld ring is positioned around a periphery of the process fluid side of the isolation diaphragm. The weld ring is formed of a first material compatible with the isolation diaphragm and a second material compatible with the process device body. A weld secures the weld ring to the process device body.

DETAILED DESCRIPTION OF ILLUSTRATIVE EMBODIMENTS

Figure 1:
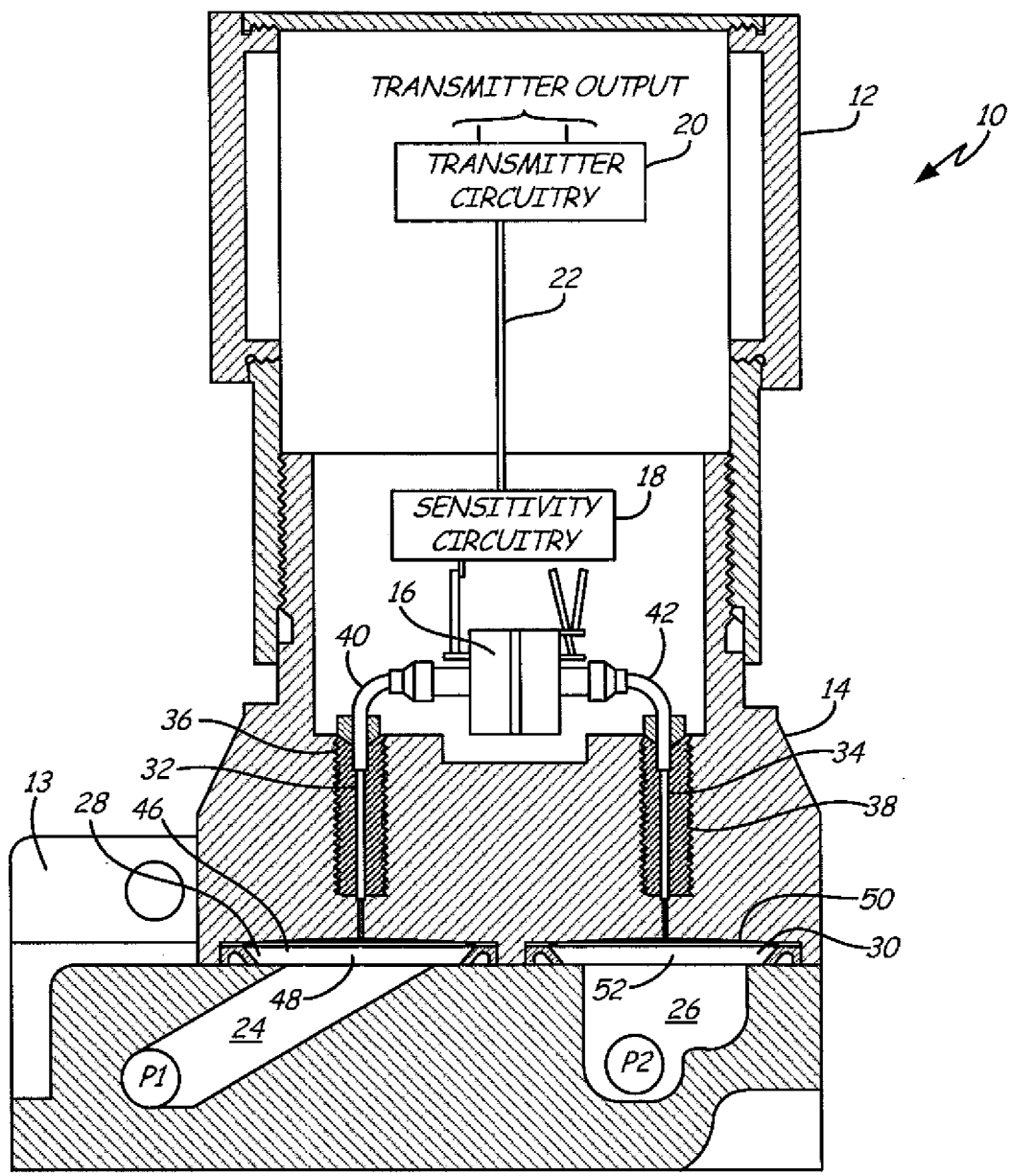
FIG. 1 is a diagrammatic view of a process fluid pressure transmitter with which embodiments of the present invention are particularly useful.

FIG. 1 shows an exemplary process fluid pressure transmitter 10 with which embodiments of the present invention are particularly useful. Transmitter 10 includes transmitter body 12, coupling flange or manifold 13 and sensor body 14. Although embodiments of the present invention will be described with respect to a Coplanar™ flange, embodiments of the present invention may be practiced on any kind of flange, manifold, or other coupling adapter that receives a process fluid.

Sensor body 14 includes pressure sensor 16, and transmitter body 12 includes transmitter circuitry 20. Sensor circuitry 18 is coupled to transmitter circuitry 20 through communication bus 22. Transmitter circuitry 20 sends information related to pressure of the process fluid over a communication link such as a two wire process control loop (or circuit). The transmitter 10 may be wholly powered over the control loop.

In one embodiment, pressure sensor 16 measures a difference in pressure between pressure P1 in passageway 24 and pressure P2 in passageway 26 of flange 13. Pressure P1 is coupled to sensor 16 through passageway 32. Pressure P2 is coupled to sensor 16 through passageway 34. Passageway 32 extends through coupling 36 and tube 40. Passageway 34 extends through coupling 38 and tube 42. Passageways 32 and 34 are filled with a relatively incompressible fluid such as oil. Couplings 36 and 38 are threaded into sensor body 14 and provide a long flame-quenching path between the interior of the sensor body 14 carrying sensor circuitry 18 and process fluid contained in passageways 24 and 26.

Passageway 24 is positioned adjacent opening 28 in sensor body 14. Passageway 26 is positioned adjacent opening 30 in sensor body 14. Diaphragm 46 is positioned in opening 28 and is coupled to sensor body 14 adjacent to passageway 24. Passageway 32 extends through coupling 36 and sensor body 14 to diaphragm 46. Diaphragm 50 is coupled to sensor body 14 adjacent to passageway 26. Passageway 34 extends through coupling 38 and sensor body 14 to diaphragm 50.

In operation, flange 13 presses against seals 48 and 52 when transmitter 10 is bolted to flange 13. Seal 48 is seated on sensor body 14 adjacent to opening 24 and diaphragm 46, and prevents process fluid leakage from passageway 24 and opening 28 past flange 13 to the outside environment. Similarly, seal 52 is coupled to sensor body 14 adjacent to opening 26 and diaphragm 50, and prevents process fluid leakage from passageway 26 and opening 30 past flange 13 to the outside environment. Seals 48 and 52 are configured in accordance with embodiments of the present invention.

Figure 2:
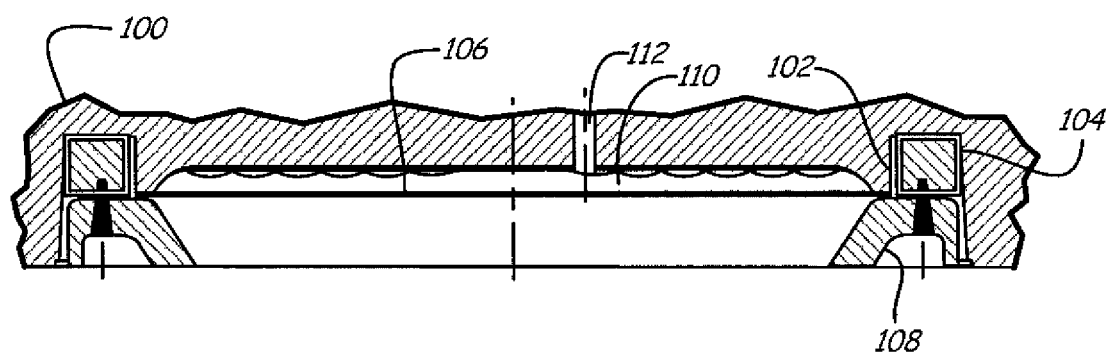
FIG. 2 is a cross sectional view of a portion of a known isolation assembly.

FIG. 2 is a diagrammatic cross section view of an isolator assembly for a process fluid pressure transmitter configured for high corrosion resistance in accordance with the prior art. Typically, the stainless steel sensor body 100 is machined to have a groove 102 that accepts a solid tantalum ring 104. Ring 104 is then brazed into groove 102 in accordance with known techniques. Tantalum isolation diaphragm 106 is disposed between solid tantalum weld ring 108 and tantalum ring 104. A very hot weld, such as an electron beam weld, is then used to fuse the tantalum weld ring 108, tantalum foil 106, and brazed-in tantalum ring 104 together. Since the weld is through a single type of material (such as tantalum) the proper heat settings can be used to achieve a very high quality weld. The final assembly resembles a standard isolator assembly with the exception of brazed-in ring 104, and the fact that diaphragm 106 and weld ring 108 are constructed from tantalum. However, a sealed isolation chamber 110 is still created with a passageway 112 that will be fluidically coupled to a pressure sensor.

One of the disadvantages of prior approaches to fabricating process fluid isolation systems with extremely high corrosion resistance is that a substantial amount of tantalum material is required and such material is generally quite expensive. Thus, the current state of design for tantalum-based isolation systems includes high production costs, long leadtimes, and the involvement of numerous suppliers. It is believed that the cost of a tantalum-based module exceeds that of a standard module by more than an order of magnitude. Further, the leadtime for a tantalum-based process fluid pressure transmitter is approximately triple that of a standard design.

One attempt to provide an isolation assembly using tantalum is set forth in U.S. Pat. No. 4,136,603. That reference reports an annular transition member that is formed of an outer region of stainless steel and an inner portion of tantalum joined by a sound, hermetic molecular bond along their point of contact. The transition member is taught as being fabricated using explosive bonding techniques for joining dissimilar metals. The stainless portion of the transition member is then welded to the stainless steel mounting body, and the tantalum portion is welded to tantalum diaphragm. However, the transition member of '603 patent is not without its drawbacks, and further developments would be useful in providing a process seal for use in highly-corrosive environments that can better leverage current manufacturing techniques and economies of a scale.

Figure 3:
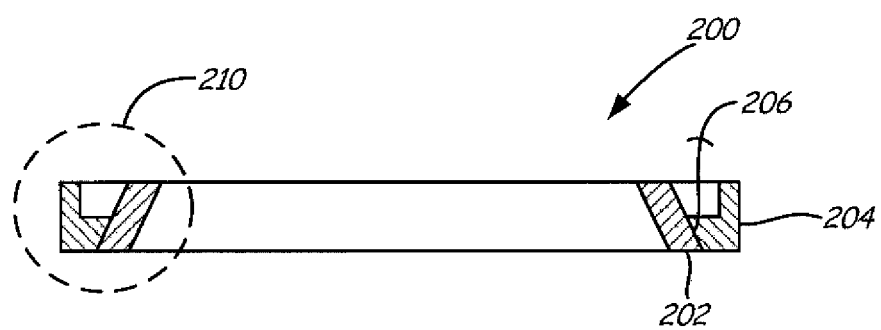
FIG. 3 is a cross sectional view of a composite weld ring in accordance with an embodiment of the present invention.

FIG. 3 is a diagrammatic view of a weld ring for use in highly corrosive process fluid environments in accordance with an embodiment of the present invention. Weld ring 200 has an overall shape that is dimensionally similar, if not identical, to standard weld rings. However, weld ring 200 is formed of two distinct and metallurgically incompatible materials. First portion 202 is selected for its property of high-corrosion resistance. Second portion 204 is formed of a material that is compatible with the sensor body of the process fluid pressure transmitter. An example of material 202 is tantalum, while an example of material 204 is 316 L stainless steel. However, those skilled in the art will recognize that embodiments of the present invention can be practiced using other combinations of material. In the case of tantalum and stainless steel, tantalum has a melting point that is substantially higher than stainless steel. Accordingly, explosion welding is preferably used on the two materials, since it is impractical to weld them together using common welding techniques.

Explosion welding is a process that can produce a bond between two metals that cannot necessarily be welded by known methods. Instead of actually melting one or both of the materials, explosion welding plasticizes the surfaces of both materials. The materials are then brought into intimate contact via the extreme pressure of the explosion and a weld is created. While explosive welding is beneficial for the ability to bond metallurgically incompatible materials together, the nature of the process is somewhat limited and it is generally not feasible to explosively weld intricate and/or complex components. Explosion welded components are generally in the form of plates or tubes. However, the complexity of the weld ring and the dimensional precision required of process fluid isolation diaphragms is believed to limit the potential use of explosive welding for weld rings and/or generate substantial scrap.

Figure 4:
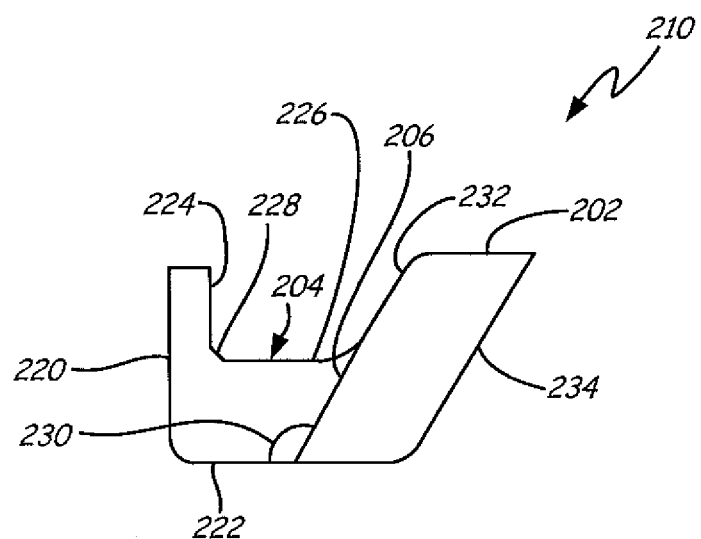
FIG. 4 is a cross sectional view of a portion of a composite weld ring in accordance with an embodiment of the present invention.

FIG. 4 is an enlarged portion of region 210 shown in FIG. 3. More particularly, FIG. 4 illustrates a preferred embodiment of the present invention wherein first portion 202 meets second portion 204 at an inclined explosion-welded interface 206. Portion 204 is preferably formed of 316L stainless steel and includes a first lateral sidewall 220 that is sized to be received by the stainless steel sensor body of the process fluid pressure transmitter. Sidewall 220 meets base portion 222 at preferably a rounded right angle. An internal sidewall 224 is preferably substantially parallel to sidewall 220 and helps capture or otherwise contain a seal such as an o-ring or polytetrafluoroethylene (PTFE) gasket. Internal sidewall 224 meets groove base 226 at internal corner 228. Preferably, portions 202 and 204 meet at interface 206 such that interface 206 comprises an obtuse angle 230 with respect to the surface of base portion 222. The utilization of an obtuse angle 230 allows the size of interface 206 to be actually larger than the distance between groove base 226 and surface 222. Additionally, as shown in FIG. 4, high-corrosion resistance portion 202 preferably includes a pair of sidewalls 232, 234 that are preferably substantially parallel to one another.

The creation of composite weld ring 200 is advantageous because it allows substantially standard manufacturing processes to be employed in non-standard applications, such as those that involve high-corrosion resistance, such as tantalum. As set forth above, explosive welding is useful to bond metallurgically incompatible metals together, but that process is generally limited to very simple geometries. It is noteworthy that composite weld ring 200 is not such a simple geometry. Accordingly, one embodiment of the present invention includes the method of manufacturing the composite weld ring.

Figure 5:
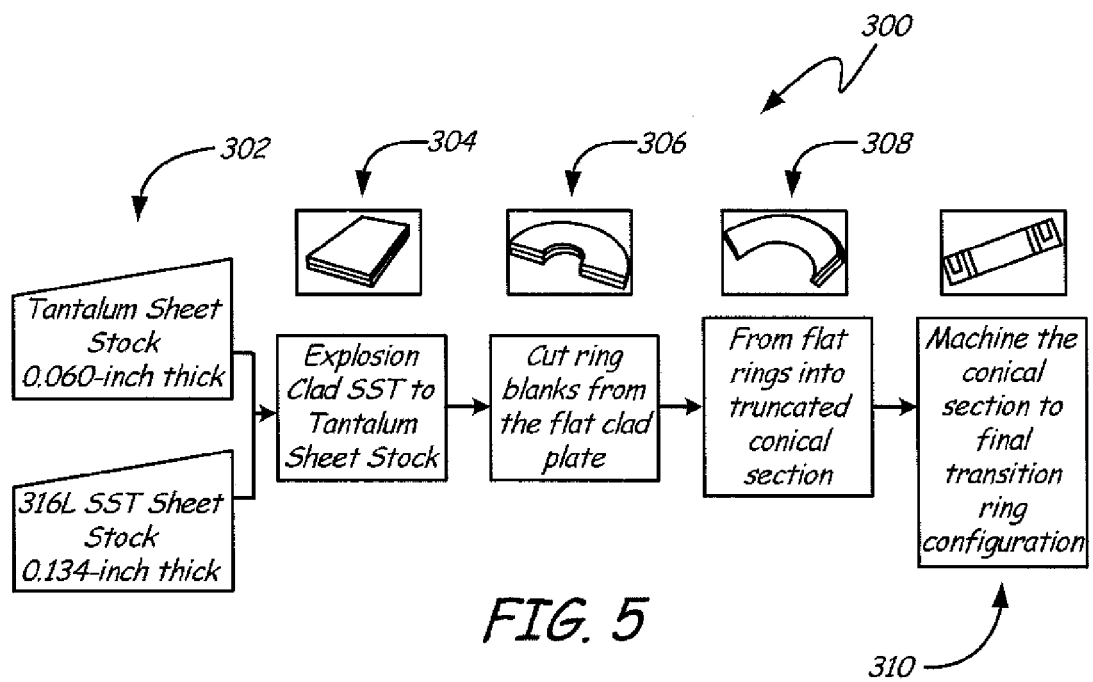
FIG. 5 is a flow diagram of a method of manufacturing a composite weld ring in accordance with an embodiment of the present invention.
Figure 6:
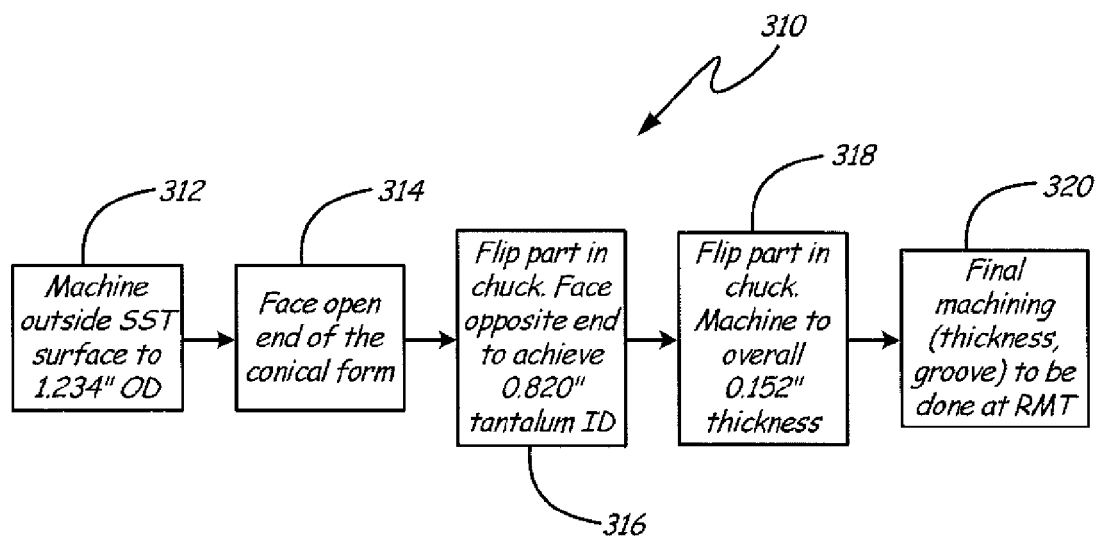
FIG. 6 is a flow diagram of a method of machining a composite weld ring in accordance with an embodiment of the present invention.

FIG. 5 is a flow diagram of a method of forming a tantalum-clad weld ring using explosion welding in accordance with an embodiment of the present invention. Method 300 begins at step 302 where two portions of sheet stock are acquired. In the example shown in FIG. 5, sheets of tantalum sheet and stainless steel are obtained. Next, at step 304, the two portions of sheet stock are explosion bonded to one another. Note, at this step, the geometry is extremely simple. Next, at step 306, ring blanks are cut or otherwise formed from the explosion clad sheet composite. At step 308, the flat ring blanks are formed into truncated conical sections. Next, at step 310, the truncated conical sections are machined to the final composite weld ring configuration. Preferably, the machining of the ring is performed as illustrated with respect to FIG. 6. The machining preferably employs a jam-chuck arrangement to hold and register the formed ring for machining and accurately positioning the weld interface in the machine ring. First, the outside stainless steel surface of the formed ring is machined to a selected dimension, as indicated at block 312. Next, the end with the open end of the internal angle is faced off to provide a clean surface as indicated at block 314. The ring is then removed from the jam-chuck and placed in a collet and the opposite end of the ring is also faced off to produce an internal opening in the tantalum at the smaller end of the internal angle as indicated at block 316. Finally, the ring is reversed in a collet and machined to a nominal length of 0.152" as indicated at block 318. Finally, final machining is performed to produce the groove and to achieve the final thickness, as indicated at block 320. The inside surface of the tantalum is preferably not machined and left in its formed and coined condition with a 60 degree to center line angle. The use of the jam-chuck machining is not only feasible, but also indicates that such techniques can be transferred to computer numeric control lathes to automated manufacture.

Composite weld rings in accordance with embodiments of the present invention differ, at least, from previous attempts at explosion-welded transition structures in that the explosion weld interface has an angled configuration in the transition ring instead of a cylindrical configuration. The expected benefit of this approach is a much more reproducible, and accurately located and dimensionally controlled explosion weld interface in the final ring.

Once the explosion-welded transition ring is created and machined to final dimensions, the weld ring is coupled to a high-corrosion resistance isolation diaphragm to form an isolator sub-assembly. The isolator diaphragm has a first side 251 (shown in FIG. 7) that faces process fluid and a second side 253 that faces isolation fluid.

Figure 7:
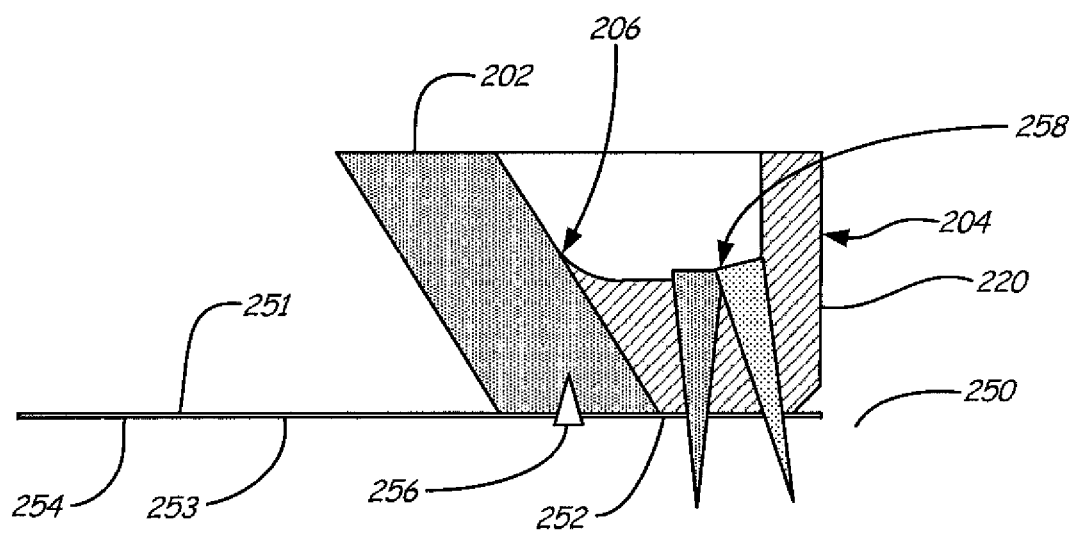
FIG. 7 is a diagrammatic cross sectional view of a portion of an isolator assembly in accordance with an embodiment of the present invention.

FIG. 7 is a cross sectional diagrammatic view of a portion of a composite weld ring coupled to a tantalum isolation diaphragm in accordance with an embodiment of the present invention. While typically, an isolation diaphragm is sized to extend completely to lateral sidewall 220, it is noted that such a configuration would require the weld of stainless steel portion 204 to the stainless steel process device/sensor body 250 to pass through the tantalum foil. Since the tantalum foil has an extremely high melting point, the weld penetration into the stainless steel body is diminished. It is thought that the tantalum foil simply acts as an impediment to the weld by consuming or otherwise absorbing energy required to reach the high melting point of tantalum. Thus, while embodiments of the present invention can be practiced with a tantalum isolation diaphragm having a diameter that causes it to extend substantially to surface 220, the more favored embodiment includes a tantalum isolation diaphragm that has a reduced diameter such that it does not extend beyond edge 252 of portion 202. A seam weld 256 is provided that couples the isolation diaphragm 254 to portion 202. The seam weld, illustrated diagrammatically at reference numeral 256, is intended to be performed using known resistance seam weld techniques, or laser seam weld techniques, such as known fiber or YAG methods. With the isolation diaphragm welded to portion 202, the entire isolator sub-assembly is then welded to the sensor body of the process fluid pressure transmitter. This is done using a laser beam weld, or other suitable weld that couples the stainless steel portion 204 to the stainless steel portion of the sensor body. In one embodiment, the laser beam weld 258 extends in a direction substantially parallel to surface 220. However, another embodiment can also be practiced by placing the laser beam weld at a slight angle to be nearly parallel to interface 206. This embodiment can help ensure sufficient distance from interface 206 and help prevent a mixed metal weld.

Thus far, embodiments of the present invention have generally focused upon a composite weld ring for use in highly corrosive process fluid environments. The weld ring described above is generally described with respect to a tantalum isolation diaphragm and a composite weld ring that has a stainless steel portion. The weld ring is used to hold the tantalum isolation diaphragm and provide a gland for a sealing gasket on a process fluid pressure transmitter. The surface of the gland for the sealing gasket is tantalum for a first portion 202 of the gland surface, and the rest of the gland surface is stainless steel 204. One design consideration or concern is that in use with highly corrosive materials, some corrosive material could potentially progress along the tantalum/gasket material interface to the point where it would reach the stainless steel. The stainless steel could then be consumed by the corrosive material leading to a degraded or failed seal. Moreover, there is also the possibility that the surface of the sealing gasket gland intended to be tantalum may in fact have some amount of stainless steel if the machined dimension does not remove all of the stainless steel. This possibility would expose the stainless steel more immediately to the corrosive material and could lead to failures on a shorter time frame.

In accordance with another embodiment of the present invention, a gasket to transmitter seal consisting substantially or entirely of tantalum/gasket material interface is employed while the weld ring is still maintained as the composite construction. The composite weld ring structure allows a reduced cost (in comparison to a solid tantalum structure) and enables easier welding of the composite weld ring to the stainless steel sensor body. This is accomplished by adding an additional tantalum foil washer to the isolator sub-assembly.

Figure 8:
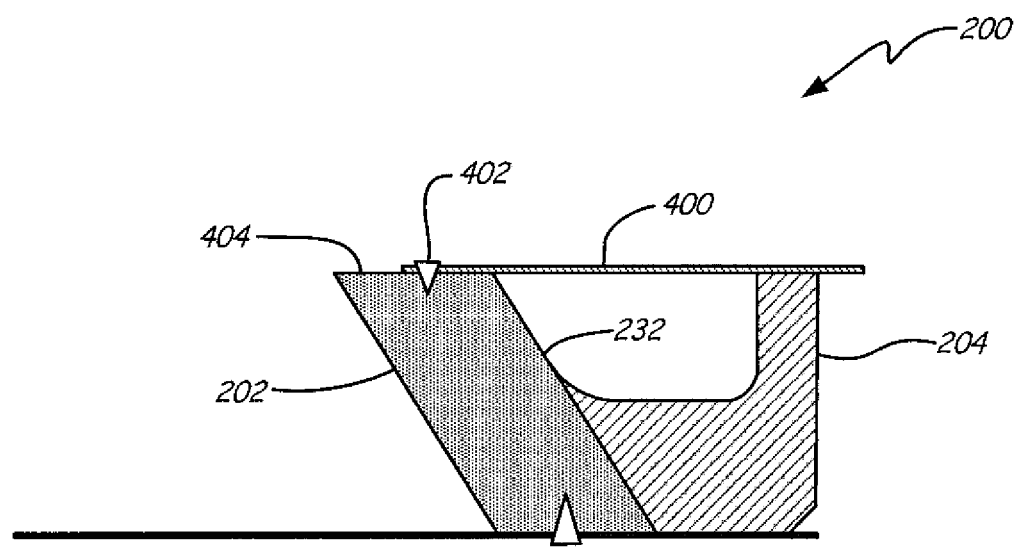
FIG. 8 is a diagrammatic cross sectional view of a portion of an isolator assembly in accordance with an embodiment of the present invention.

FIG. 8 shows a cross section of a composite weld ring 200 with an added tantalum foil washer 400 welded (402) to surface 404. Foil washer 400 extends out over the gasket gland. The portion of foil 400 extending out over the gland can then be formed down into the gland becoming the surface that the sealing gasket material will contact.

Figure 9:
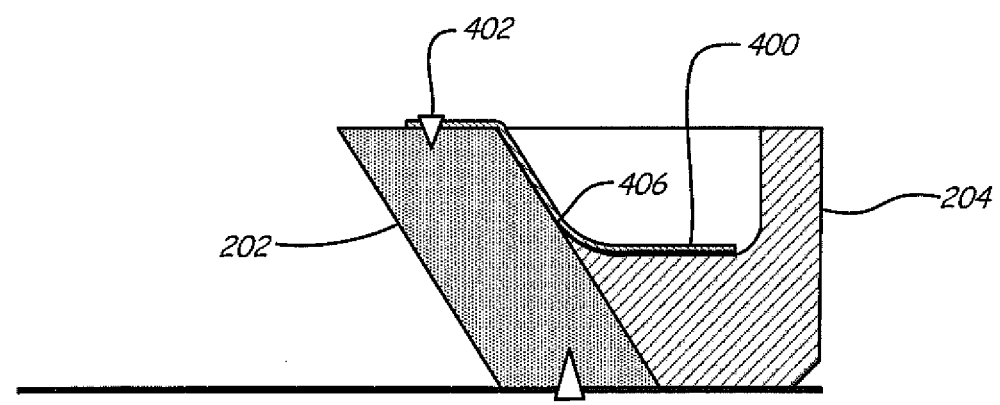
FIG. 9 is a diagrammatic cross sectional view of the portion of the isolator assembly shown in FIG. 8, with the foil washer folded into the gasket gland in accordance with an embodiment of the present invention.

FIG. 9 is diagrammatic view of the foil washer 400 (shown in FIG. 8) folded down into the gland and covering region 406 where tantalum portion 202 meets stainless portion 204 descending along sidewall 232. Weld 402 can be accomplished in any suitable manner. Since foil washer 400 is constructed from the same material as portion 202, or at least a material that is metallurgically compatible with portion 202, welding is relatively straightforward and a resistance seam weld or laser seam weld, such as fiber or YAG can be employed.

Figure 10:
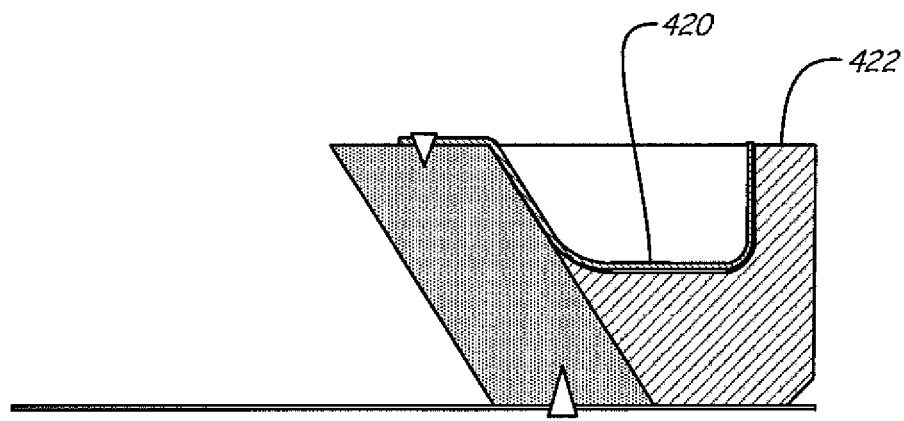
FIG. 10 is a diagrammatic cross sectional view of a portion of an isolator assembly in accordance with an embodiment of the present invention.

FIG. 10 is diagrammatic view of a composite weld ring with a tantalum foil washer 420 overlaid upon the sealing gland surface. The embodiment illustrated in FIG. 10 differs slightly from the embodiment illustrated with respect to FIGS. 8 and 9 in that washer 420 has a larger diameter and extends to substantially the height of top stainless steel portion 422.

Figure 11:
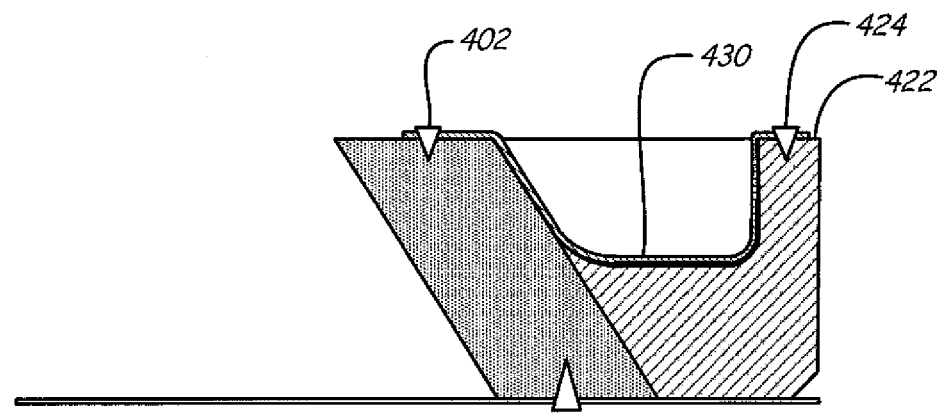
FIG. 11 is a diagrammatic cross sectional view of a portion of an isolator assembly in accordance with another embodiment of the present invention.

FIG. 11 shows yet another embodiment where the diameter of a tantalum washer 430 is large enough to extend from weld 402 to cover a portion of surface 422 such that a second seam or spot weld 424 can be employed to fix or otherwise fasten tantalum foil washer 430 in place. Note, the weld 424 is between dissimilar metals, but it is only required to mechanically fasten the washer, and need not create an extensive seal.

Figure 12:
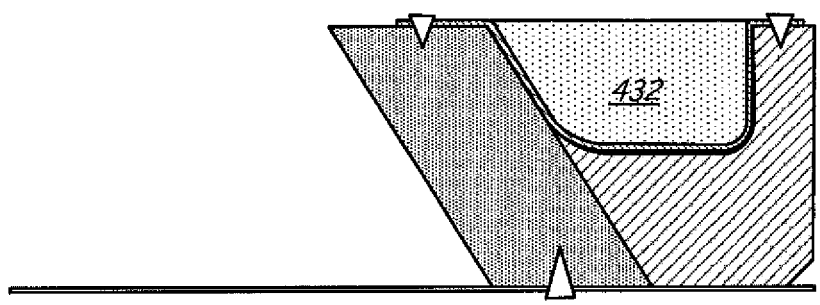
FIG. 12 is a diagrammatic cross sectional view of a portion of the isolator assembly shown in FIG. 11 with a gasket material disposed in the gasket gland.

FIG. 12 illustrates the embodiment shown in FIG. 11 with the gasket material 432 placed in the gland.

One of the advantages of embodiments of the present invention is that once the isolator sub-assembly is mounted to the process fluid pressure transmitter sensor body, subsequent manufacturing steps are substantially the same as for a standard module. Accordingly, leadtimes and manufacturing costs are reduced. Moreover, since the structure is composite and is not made entirely of tantalum or some other suitable high-corrosion resistance metal, the material cost of the overall design is reduced.

Although the present invention has been described with reference to preferred embodiments, workers skilled in the art will recognize that changes may be made in form and detail without departing from the spirit and scope of the invention. For example, while embodiments of the present invention are generally have been described with respect to a tantalum/stainless steel composite weld ring, any two metallurgically incompatible materials can be employed.

What is claimed is:

1. A process device having process seal for coupling to an industrial process, comprising:
    a process device body having an isolation cavity and an isolation passageway extending from the isolation cavity to a pressure sensor, the isolation cavity and isolation passageway filled with an isolation fluid;
    an isolation diaphragm positioned to isolate the isolation cavity from process fluid, the isolation diaphragm having a process fluid side and an isolation fluid side;
    a weld ring positioned around a periphery of the process fluid side of the isolation diaphragm, the weld ring being formed of a first material compatible with the isolation diaphragm and a second material compatible with the process device body;
    a foil washer having an inside diameter and an outside diameter, the inside diameter being attached to a portion of the weld ring formed of the first material and positioned on a surface of the weld ring opposite the isolation diaphragm; and
    a weld securing the weld ring to the process device body.

2. The process device of claim 1, wherein the first and second materials of the weld ring are joined by an explosion-welded interface.

3. The process device of claim 2, wherein the interface is an inclined interface.

4. The process device of claim 1, wherein the first material is tantalum.

5. The process device of claim 4, wherein the second material is stainless steel.

6. The process device of claim 1, wherein the second material is stainless steel.

7. The process device of claim 2, wherein a portion of the weld ring formed of the first material includes a pair of substantially parallel inclined sidewalls, wherein a first inclined sidewall of the pair of inclined sidewalls is configured to form a portion of a gasket gland.

8. The process device of claim 7, wherein a portion of the weld ring formed of the second material includes a first lateral sidewall configured to be received by the process device body, and a second lateral sidewall that is substantially parallel to the first lateral sidewall, the second lateral sidewall also forming a portion of the gasket gland.

9. The process device of claim 8, wherein the weld securing the weld ring to the process device body is substantially aligned with the first lateral sidewall.

10. The process device of claim 7, wherein the weld securing the weld ring to the process device body is substantially aligned with the first inclined sidewall.

11. The process device of claim 1, wherein the foil washer is formed of the first material.

12. The process device of claim 1, wherein the foil washer is deformed to cover at least part of a gasket gland.

13. The process device of claim 1, wherein the foil washer covers the explosion-welded interface.

14. The process device of claim 12, wherein the outer diameter is sized such that the foil washer covers substantially all of the gasket gland while the foil washer is deformed into the gasket gland.

15. The process device of claim 1, wherein the foil washer is attached to a portion of the weld ring formed of the second material.

16. The process device of claim 1, wherein the process device is a process fluid pressure transmitter.

* * * * *